US008085193B2

(12) United States Patent
Thomson et al.

(10) Patent No.: US 8,085,193 B2
(45) Date of Patent: Dec. 27, 2011

(54) SYSTEM AND METHOD FOR PREVENTING A-GPS DEVICES FROM SEARCHING FOR SPECIFIC SATELLITES

(75) Inventors: Martin Thomson, Keiraville (AU); Neil Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 436 days.

(21) Appl. No.: 12/100,290

(22) Filed: Apr. 9, 2008

(65) Prior Publication Data
US 2009/0146877 A1    Jun. 11, 2009

Related U.S. Application Data

(60) Provisional application No. 61/012,319, filed on Dec. 7, 2007.

(51) Int. Cl.
*G01S 19/03* (2010.01)
*G01S 19/08* (2010.01)
*G01S 19/28* (2010.01)

(52) U.S. Cl. .......... 342/357.42; 342/357.45; 342/357.67

(58) Field of Classification Search ............ 342/357.02, 342/357.15, 357.42, 357.45, 357.58, 357.67
See application file for complete search history.

(56) References Cited

U.S. PATENT DOCUMENTS

| | | | |
|---|---|---|---|
| 5,543,813 A | 8/1996 | Araki et al. | |
| 5,999,125 A | 12/1999 | Kurby | |
| 6,278,404 B1 | 8/2001 | Niles | |
| 6,429,808 B1 * | 8/2002 | King et al. | ............... 342/357.02 |
| 6,583,756 B2 | 6/2003 | Sheynblat | |
| 6,661,371 B2 | 12/2003 | King et al. | |
| 6,804,290 B1 | 10/2004 | King et al. | |
| 6,825,805 B2 | 11/2004 | Rowitch | |
| 7,019,690 B1 | 3/2006 | Pitt | |
| 7,064,706 B2 | 6/2006 | King et al. | |
| 7,138,943 B2 * | 11/2006 | Sheynblat | ................ 342/357.09 |
| 7,142,155 B2 | 11/2006 | Iwami | |
| 2003/0011511 A1 | 1/2003 | King et al. | |
| 2005/0164713 A1 | 7/2005 | Tang-Taye | |
| 2005/0212700 A1 | 9/2005 | Diggelen et al. | |
| 2006/0012515 A1 | 1/2006 | Park et al. | |
| 2006/0111840 A1 | 5/2006 | Diggelen et al. | |

FOREIGN PATENT DOCUMENTS

| | | |
|---|---|---|
| EP | 0984295 A | 3/2000 |
| EP | 1783509 A1 | 5/2007 |

OTHER PUBLICATIONS

European Patent Office, International Search Report in related PCT Application No. PCT/US2008/013236, mailed May 6, 2009, p. 1-4.
European Patent Office, International Search Report in related PCT Application No. PCT/US2008/013239, mailed May 6, 2009, p. 1-4.
European Patent Office, International Search Report in related PCT Application No. PCT/US2008/013231, mailed May 6, 2009, p. 1-4.
European Patent Office, International Search Report in related PCT Application No. PCT/US2008/013237, mailed May 6, 2009, p. 1-3.
Hill, Jonathan, "The Principle of a Snapshot Navigation Solution Based on Doppler Shift," ION GPS 2001, Salt Lake City, UT, Sep. 11-14, 2001, p. 3044-3051.

* cited by examiner

*Primary Examiner* — Gregory C Issing
(74) *Attorney, Agent, or Firm* — Duane Morris, LLP

(57) ABSTRACT

A system and method for estimating the location of a wireless device. A set of satellites may be determined as a function of an approximate area in which the wireless device is located. Assistance data is transmitted to the device including information from the set of satellites, and a location of the device may be estimated from the information where the assistance data prevents the wireless device from searching for signals from one or more satellites in the set of satellites. The one or more satellites may be an operable satellite but signals therefrom cannot be measured or acquired by the wireless device.

10 Claims, 3 Drawing Sheets

200

210
Determine set of satellites

220
Transmit assistance data to a device

230
Estimate location of the device

FIG. 2

SYSTEM AND METHOD FOR PREVENTING A-GPS DEVICES FROM SEARCHING FOR SPECIFIC SATELLITES

RELATED APPLICATIONS

The instant application claims the priority benefit of U.S. Provisional Application No. 61/012,319, filed Dec. 7, 2007, the entirety of which is incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, the United States Federal Communications Commission ("FCC") has required that cellular handsets must be geographically locatable by the year 2001. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination, and sensitivity requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network) including receivers with clear views of the sky that may operate continuously. This reference network may also be connected with the cellular infrastructure, may continuously monitor the real-time constellation status, and may provide data for each satellite at a particular epoch time. For example, the reference network may provide the ephemeris and the other broadcast information to the cellular infrastructure. In the case of D-GPS, the reference network may provide corrections that can be applied to the pseudoranges within a particular vicinity. As one skilled in the art would recognize, the GPS reference receiver and its server (or position determination entity) may be located at any surveyed location with an open view of the sky.

However, the signal received from each of the satellites may not necessarily result in an accurate position estimation of the handset or mobile device. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference. A-GPS implementations generally rely upon provided assistance data to indicate which satellites are visible. As a function of the assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

Accordingly, there is a need for a method and apparatus for geographic location determination of a device that would overcome the deficiencies of the prior art. Therefore, an embodiment of the present subject matter provides a method for determining the location of a wireless device. The method comprises the steps of determining a set of satellites as a function of an approximate area in which the wireless device is located and transmitting assistance data to the device where the assistance data includes information from the set of satellites. A location of the device may then be estimated from the information where the assistance data may prevent the wireless device from searching for signals from one or more satellites in the set of satellites.

In another embodiment of the present subject matter a system is provided for determining the location of a device from signals received from a plurality of GNSS satellites. The system comprises circuitry for determining a set of satellites as a function of an approximate area in which a device is located and a transmitter for transmitting assistance data to the device where the assistance data includes information from the set of satellites. The system may also include circuitry for estimating a location of the device from the information where the assistance data prevents the wireless device from searching for signals from one or more satellites in the set of satellites.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 2 is an algorithm according to one embodiment of the present subject matter.

DETAILED DESCRIPTION

Figure 1:
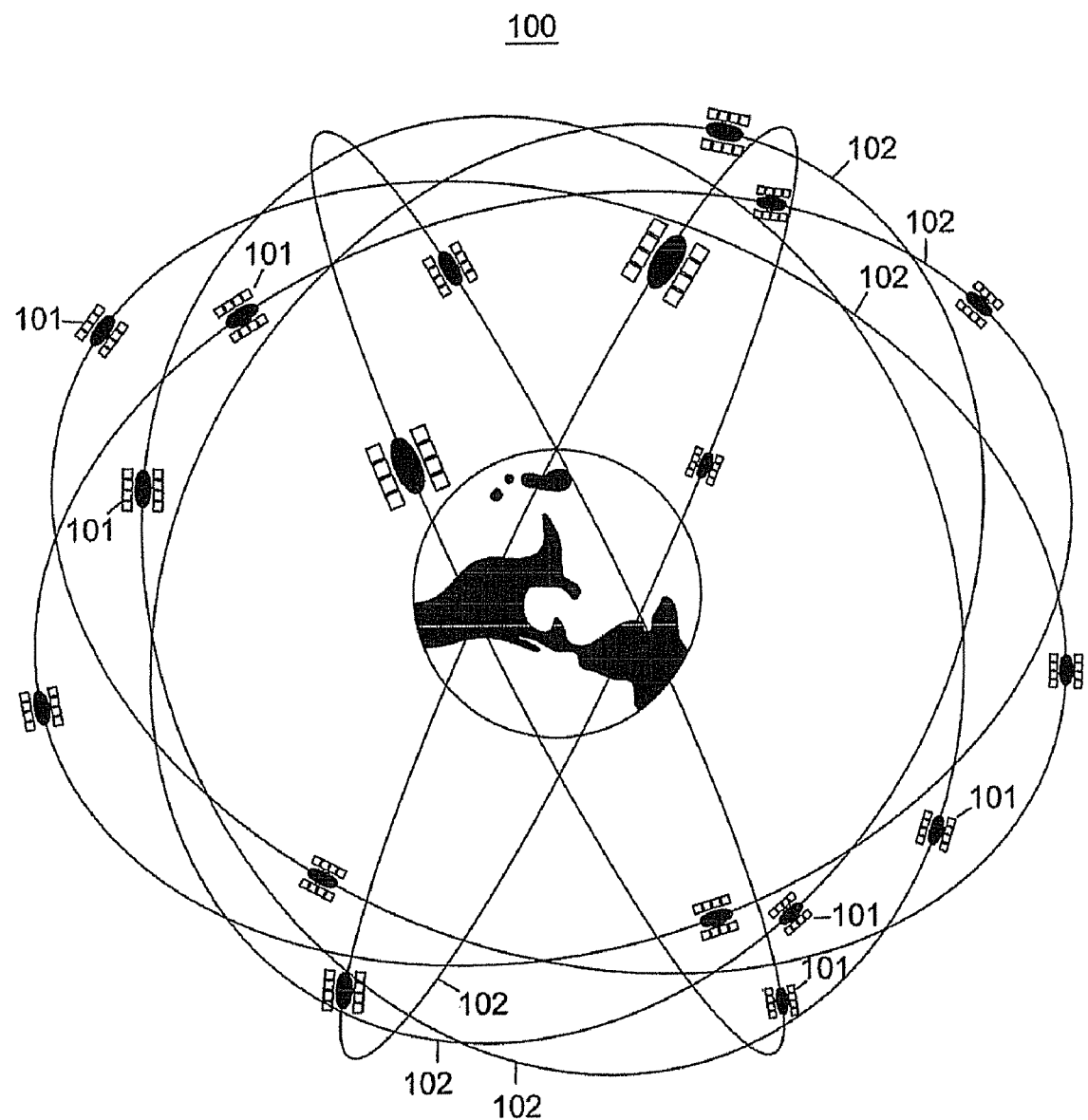
FIG. 1 is a schematic representation of a constellation of GPS satellites.

With reference to the figures where like elements have been given like numerical designations to facilitate an understanding of the present subject matter, the various embodiments of a system and method for determining the geographic location of a device and for preventing a mobile device from searching for specific satellites are herein described.

The disclosure relates to methods and apparatuses for determining geolocation using satellite signals and assistance data. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary network elements that supply the assistance data may be a Mobile Location Center ("MLC") or other comparable network element.

Typical A-GPS information includes data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device. The MLC may then supply the device with the appropriate A-GPS assistance data for the set of satellites in view from this conventional location.

Further, A-GPS information also generally includes a set of satellites that are "in view," that is, satellites that a mobile device may be able to measure. In certain instances, however, the set of "in view" satellites may be incorrect. This may occur where the approximate location is unknown for the mobile device before the assistance data is created, or where conditions change.

As discussed above, A-GPS implementations rely upon provided assistance data from a communications network to indicate which satellites are visible. A mobile device will attempt to search for and acquire satellite signals for the satellites included in the assistance data; however, if satellites included in the assistance data are not measurable by the mobile device, considerable time and power may be expended by the device in attempting to acquire measurements for one or more satellites.

Real Time Integrity assistance data type is generally used to convey information about satellites that are in a state of disrepair, e.g., "unhealthy" satellites. This Real Time Integrity assistance data is utilized by GPS constellation management to effectively take certain satellites out of service for maintenance. Generally, a satellite included in the Real Time Integrity data set is considered "unhealthy" or "bad" and mobile devices do not attempt to take measurements from or search for such satellites.

Embodiments of the present subject matter may utilize Real Time Integrity assistance data to suppress any attempts to search for satellites that are known not to be measurable. These satellites may be "healthy" and are included in the Real Time Integrity assistance data by identifying the satellites as "unhealthy" or "bad" to thereby prevent an exemplary mobile device from attempting to search and acquire signals from these satellites. Real Time Integrity assistance data according to embodiments of the present subject matter may be acquired from satellite signals and manipulated by an exemplary communications network or element thereof to include the aforementioned information.

Embodiments of the present subject matter may be particularly relevant where the set of satellites sent to the mobile device requires refinement over several passes. Therefore, if data sent in an earlier pass indicates satellites that cannot be measured, subsequent sets of assistance data may indicate these satellites are "bad" or "unhealthy." Providing incremental assistance data may also ensure that data transmission consumes less time and relies upon information already known by the mobile device.

It is therefore an aspect of embodiments of the present subject matter to improve the speed of A-GPS signal acquisition by forcing an exemplary mobile device to stop searching for satellites that cannot be measured.

It is an additional aspect of embodiments of the present subject matter to prevent mobile devices from searching for satellites that are known to be not measurable to thereby reduce time spent measuring satellites.

FIG. 2 is an algorithm 200 according to one embodiment of the present subject matter. With reference to FIG. 2, at step 210, a set of satellites may be determined as a function of an approximate area in which a wireless device is located. The satellites may be part of a GNSS such as, but not limited to, GPS, Galileo, GLONASS, and QZSS. An exemplary device may be a cellular device, text messaging device, computer, portable computer, vehicle locating device, vehicle security device, communication device, and/or wireless transceiver. In embodiments of the present subject matter, the approximate area may be, but is not limited to, a serving area of a base station serving the wireless device, an approximate area of a communications network, city, municipality, county, state, country, and/or continent. Additional embodiments may define an area by the boundary thereof and determine a set of satellites as disclosed in co-pending U.S. patent application Ser. No. 12/050,794, filed Mar. 18, 2008 entitled "Method and System for Providing Assistance Data for A-GPS Location of Handsets in Wireless Networks," the entirety of which is incorporated herein by reference.

Assistance data may then be transmitted to the device which includes information from the set of satellites, at step 220. In embodiments of the present subject matter, the assistance data may prevent the wireless device from searching for signals from one or more satellites in the set of satellites. In one embodiment of the present subject matter, the assistance data may be Real Time Integrity assistance data. At step 230, a location of the device may be estimated from the information. In an alternative embodiment, the estimated location of the device may be a function of signals provided by a cellular network.

Figure 3:
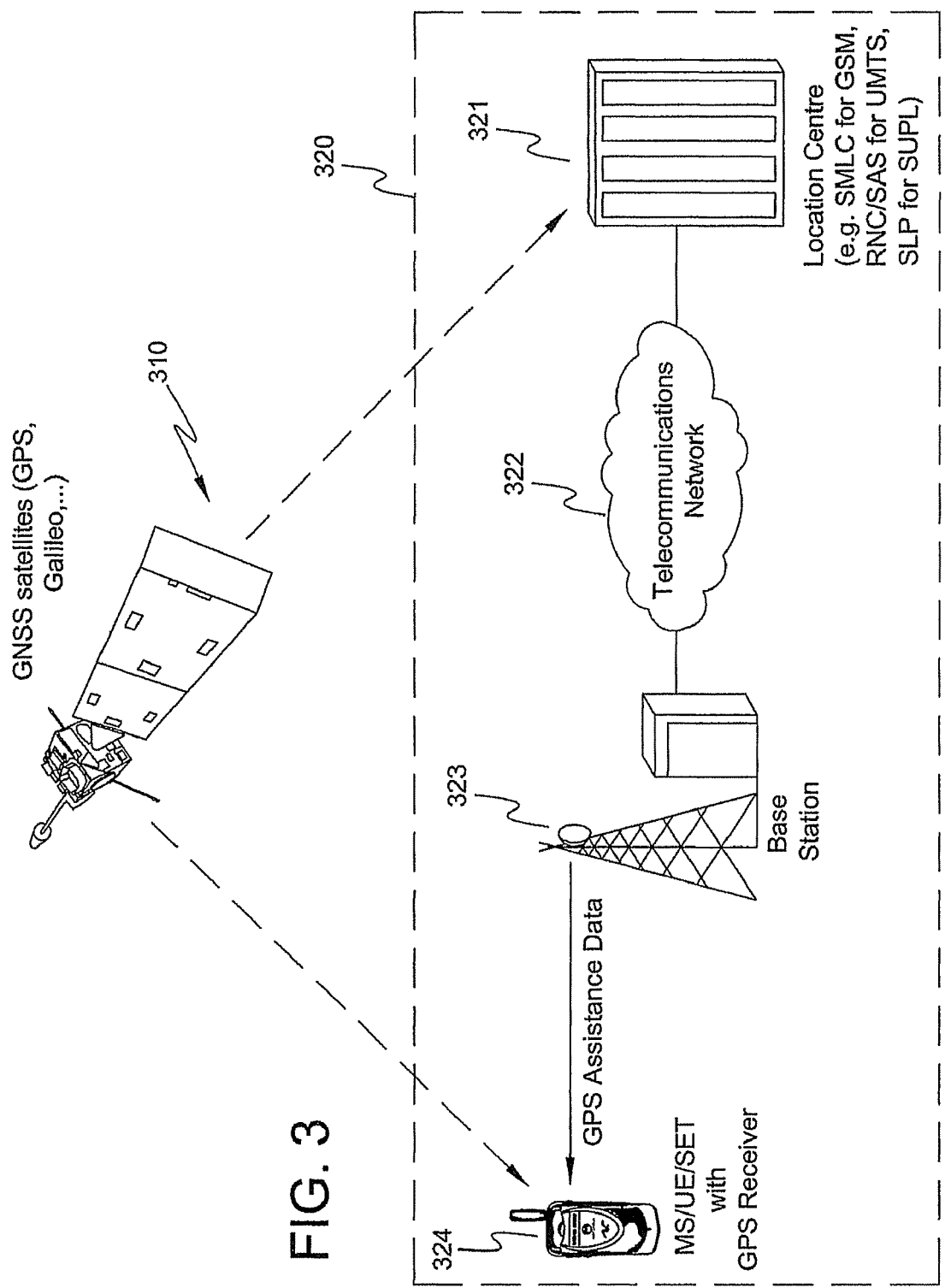
FIG. 3 is a schematic representation for implementing one embodiment of the present subject matter.

FIG. 3 is a schematic representation for implementing one embodiment of the present subject matter. With reference to FIG. 3, a satellite system 310 communicates with a ground system 320. The ground system 320 may include a cellular network having a location center 321. The location center 321 may be a Mobile Location Center (MLC) or a central office configured to communicate with a telecommunication network 322 and at least one base station 323. In one embodiment of the present subject matter, a device 324 communicates with the base station 323 to acquire GPS assistance data. For example, the location center 321 may or may not receive a preliminary estimate of the receiver's location or boundary thereof on the basis of the receiver's cell site or other area, such as the boundary of the communications network or an area or region such as, but not limited to, city, municipality, county, state, country, or continent. The location center 321 may also determine a plurality of satellites as a function of this boundary or region and determine whether any one or more of these plural satellites, while operational, are not visible by the device 324 for some reason. The location center 321 may also receive satellite information from GPS satellites. The satellite information may include the satellite's broadcast ephemeris information of the broadcasting satellite or that of all satellites or that of selected satellites. Further, the location center 321 may manipulate the assistance data to prevent the device 324 from searching and attempting to acquire signals from these one or more plural satellites. This information may then be transmitted or relayed to the mobile receiver and utilized for location determination. The location center 321 may relay the information back to the device 324 or use the information, either singularly or along with some preliminary estimation of the device's location, to assist the device in a geographic location determination. In another embodiment, any one or plural steps illustrated in FIG. 2 may be implemented at the location center 321 and communicated to the device 324. Of course, the estimated location of the device 324 may be determined as a function of additional signals provided by the network 322. Exemplary devices may be, but are not limited to, a cellular device, text messaging device, computer, portable computer, vehicle locating device, vehicle security device, communication device, and wireless transceiver.

As shown by the various configurations and embodiments illustrated in FIGS. 1-3, a method and system for determining the geographic location of a device and preventing an A-GPS device from searching for specific satellites have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating the location of a wireless device comprising the steps of:
    (a) determining a set of satellites as a function of an approximate area in which the wireless device is located;
    (b) transmitting assistance data to said device, said assistance data including information from said set of satellites and Real Time Integrity assistance data;
    (c) modifying said Real Time Integrity assistance data by identifying one or more healthy satellites in said set of satellites as unhealthy or bad;
    (d) receiving said modified transmitted assistance data by said device;
    (e) preventing said device from searching for and acquiring signals from said identified one or more healthy satellites as a function of the modified Real Time Integrity assistance data; and
    (f) estimating a location of the device from said information exclusive of information from said identified one or more healthy satellites.

2. The method of claim 1 wherein the estimated location of the device is a function of signals provided by a cellular network.

3. The method of claim 1 wherein the satellites are part of a Global Navigation Satellite System ("GNSS").

4. The method of claim 3 wherein the GNSS is selected from the group consisting of: Global Positioning System ("GPS"), Galileo, GLONASS, and Quasi-Zenith Satellite System ("QZSS").

5. The method of claim 1 wherein the wireless device is selected from the group consisting of: cellular device, text messaging device, computer, portable computer, vehicle locating device, vehicle security device, communication device, and wireless transceiver.

6. The method of claim 1 wherein the approximate area is selected from the group consisting of: a serving area of a base station serving said wireless device, an approximate area of a communications network, city, municipality, county, state, country, and continent.

7. A system for determining a location of a device from signals received from a plurality of Global Navigation Satellite System ("GNSS") satellites comprising:
    (a) circuitry for determining a set of satellites as a function of an approximate area in which a device is located;
    (b) a transmitter for transmitting assistance data to said device, said assistance data including information from said set of satellites;
    (c) circuitry for modifying said Real Time Integrity assistance data by identifying one or more healthy satellites in said set of satellites as unhealthy or bad;
    (d) a receiver for receiving said transmitted assistance data by said device;
    (e) circuitry for preventing said wireless device from searching for and acquiring signals from said identified one or more healthy satellites as a function of the modified Real Time Integrity assistance data; and
    (f) circuitry for estimating a location of said device from said information exclusive of information from said identified one or more healthy satellites.

8. The system of claim 7 wherein the GNSS is selected from the group consisting of: Global Positioning System ("GPS"), Galileo, GLONASS, and Quasi-Zenith Satellite System ("QZSS").

9. The system of claim 7 wherein the wireless device is selected from the group consisting of: cellular device, text messaging device, computer, portable computer, vehicle locating device, vehicle security device, communication device, and wireless transceiver.

10. The system of claim 7 wherein the approximate area is selected from the group consisting of: a serving area of a base station serving said wireless device, an approximate area of a communications network, city, municipality, county, state, country, and continent.

* * * * *